Oct. 3, 1961 G. J. MIHAL 3,002,579
VEHICLE CONSTRUCTION AND PUMP MOUNTING THEREFOR
Filed June 25, 1958 2 Sheets-Sheet 1

INVENTOR.
G. J. MIHAL

Oct. 3, 1961  G. J. MIHAL  3,002,579
VEHICLE CONSTRUCTION AND PUMP MOUNTING THEREFOR
Filed June 25, 1958  2 Sheets-Sheet 2
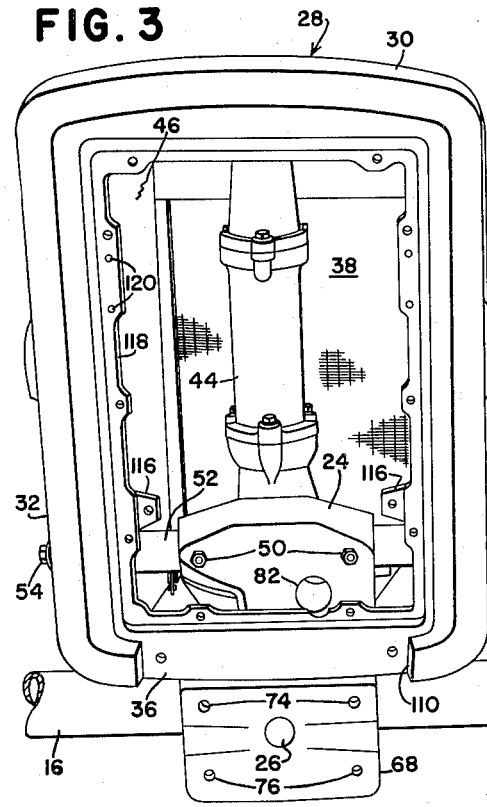
FIG. 3
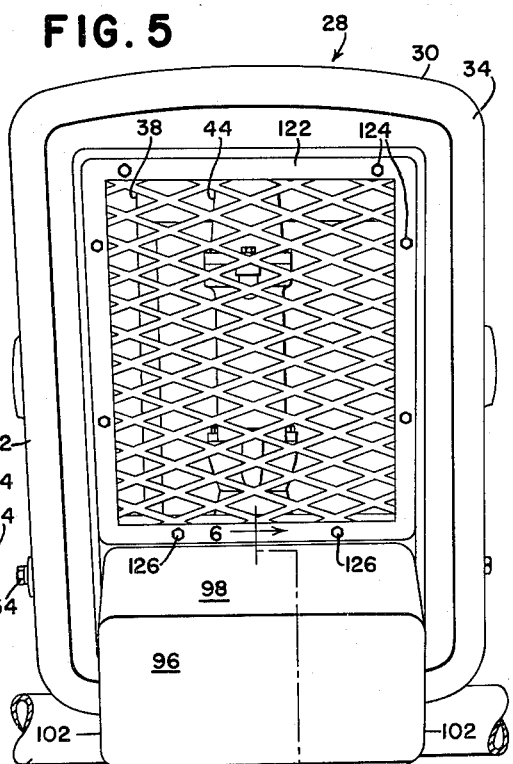
FIG. 5
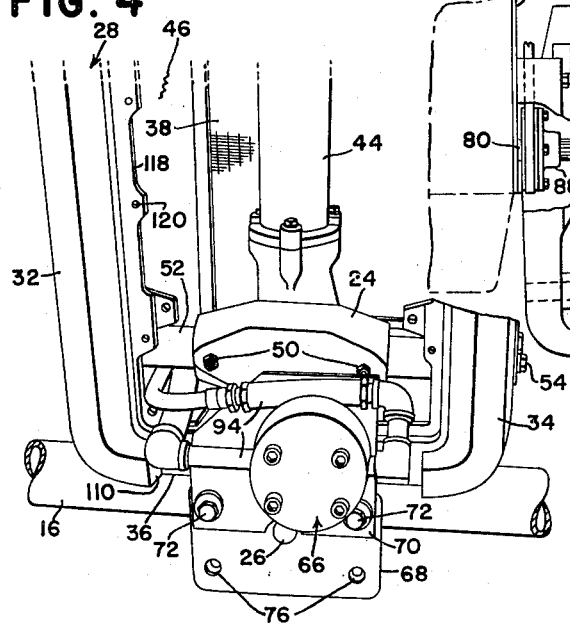
FIG. 4
FIG. 6
INVENTOR.
G. J. MIHAL

United States Patent Office 3,002,579
Patented Oct. 3, 1961

3,002,579
VEHICLE CONSTRUCTION AND PUMP MOUNTING THEREFOR
Gust J. Mihal, Dubuque, Iowa, assignor, by mesne assignments, to Deere & Company, a corporation of Delaware
Filed June 25, 1958, Ser. No. 744,545
6 Claims. (Cl. 180—53)

This invention relates to a vehicle construction and more particularly to an improved means for mounting an auxiliary device such as a hydraulic pump on the front end of a tractor.

The invention finds particular utility in the agricultural or industrial field in which a pump is mounted at the front end of the tractor and is driven from the front end of the crankshaft or similar power shaft of the internal combustion engine or equivalent power plant. Although pump mountings of the general character referred to are known, there is room for improvement in the details of the mounting and the association therewith of other structural parts of the vehicle. According to the present invention, it is an important object to provide an improved pump mounting incorporating a protective enclosure associated with a front end or radiator grille construction. It is a further object to incorporate in the mounting a cover which at least partly overlaps the frontal opening in the radiator grille, and to supplement this opening with a panel that fills in the remainder of the opening.

Further objects reside in simplicity of construction, ease of assembly, disassembly and maintenance, and such other objects and features, inherent in and encompassed by the invention, as will be become apparent from the disclosure of a preferred embodiment of the invention in the ensuing description and accompanying sheets of drawings, the several figures of which are described immediately below.

FIG. 3 is a front view of the front part of the tractor with the pump and grille panel removed.

FIG. 4 is a fragmentary similar view showing the intermediate stage of mounting the pump.

FIG. 5 is a view similar to FIG. 3 but shows the final assembly.

FIG. 6 is a fragmentary longitudinal section on the line 6—6 of FIG. 5.

Figure 1:
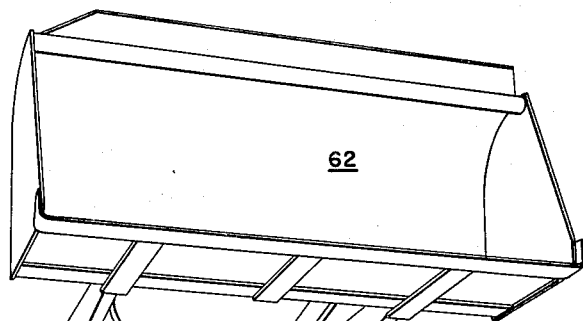
FIG. 1 is a perspective of a tractor and tractor-mounted loader illustrating one field in which the invention finds utility.
Figure 2:
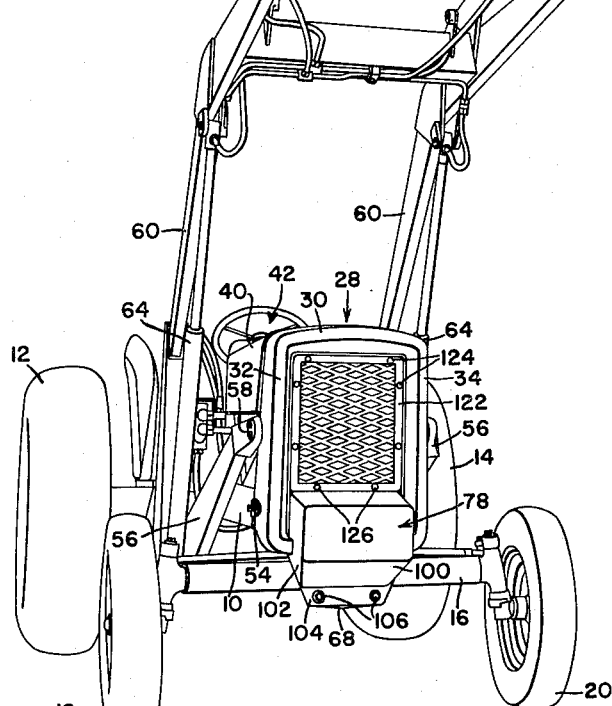
FIG. 2 is a fragmentary perspective of the front portion of the tractor.
Figure 2:
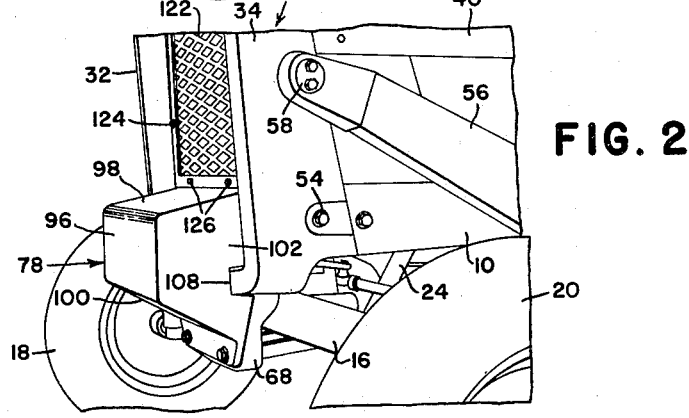

The vehicle chosen for purposes of illustration is a typical agricultural or industrial tractor having a main fore-and-aft body 10 carried on right and left hand rear traction wheels 12 and 14 and on a front transverse axle 16 having right and left hand steerable front wheels 18 and 20. The forward part of the body includes an internal combustion engine 22 which here represents the power source for driving the tractor and for powering certain auxiliaries associated with the tractor.

A rigid relatively heavy and preferably cast support 24 is securely affixed to the front part of the engine 22 and affords the front end of the tractor body, and this support by means of a fore-and-aft pivot pin 26 mounts the steerable wheel structure made up of the axle 16 and front wheels 18 and 20.

The support 24 also carries a frontal element 28 which here comprises a generally rectangular relatively heavy and preferably cast frame including a transverse top part 30, opposite upright side parts 32 and 34 and a transverse bottom part 36 (FIG. 3). The element 28 rises from the support 24 in protective relation to an upright coolant radiator 38 which is conventionally disposed ahead of the engine 22. The element forms the basic frontal part of the tractor and an engine hood 40 extends rearwardly to a typical operator's station on the tractor, designated in its entirety by the numeral 42.

In addition to the functions already ascribed to the support 24, it carries interiorly of the hood and grille arrangement, or intermediate the element 28 and radiator 38, housing structure 44 in which is mounted certain components, not material here, of the steering mechanism for the front wheels 18 and 20. Reference is made to this arrangement for the purpose of illustrating component parts behind the frontal element 28 to which access may be had from the front of the tractor by a frontal opening 46 defined by the parts 30, 32, 34 and 36 of the element 28.

As best shown in FIGS. 3 and 6, the support 24 has therein a transverse bore 48 in which is rigidly supported, as by set screws 50, a transverse shaft 52 to opposite ends of which the upright element 28 is mounted as by cap screws 54. The mounting is such that the frontal element 28 may have limited fore-and-aft movement about the axis of the transverse shaft 52, but this movement is normally prevented because the hood 40 is tied into the element as well as into other portions of the tractor. The purpose of the mounting stems from the use of the element 28 as a protective element rather than merely a surrounding shell as is typical of the usual radiator grille structure. Connections of the hood 40 to the element 28 are designed to afford adequate lost motion in the event that the element 28 encounters a force sufficient to compel it to tilt rearwardly about the axis of the shaft 52. In the particular environment in which the tractor is illustrated, the frontal element serves an important part of the mounting of a typical material-handling loader, which has a rigid basic frame including forwardly projecting arms 56 mounted at 58 to opposite sides of the element 28 as well as to rear portions of the tractor, the details of which are not material here except as to set up a background for the particular construction of the element 28. In the particular example illustrated, the arms 56, rather than the hood 40, will take the forces transmitted to the element 28 in the event that the element encounters an obstacle while the tractor is being driven forwardly, which commonly occurs in the particular environment because the vehicle may be inadvertently driven against another vehicle, particularly in the loading operation, as when loading a truck or wagon. The loader shown has opposite booms 60 to the free forward ends of which is attached a typical loader bucket 62. The rear ends of the booms 60 are pivoted in any suitable manner to the rear portion of the tractor so that the booms as a unit may be raised and lowered through the medium of fluid motors or hydraulic cylinders 64 at each side of the tractor.

The hydraulic cylinders 64 of the loader are a part of a hydraulic system for controlling the loader, by any suitable valve means, not shown, and which receives its power from a conventional or otherwise hydraulic pump 66, the mounting of which at the front of the tractor forms part of the novelty of the present invention. For the purpose of mounting the pump 66, which may be taken as representative of an auxiliary device for the tractor and its equipment, the support 24 has a depending mounting element or portion 68 which affords an apertured front face for receiving a pump mounting plate 70 via cap screws 72 or equivalent fasteners. As best shown in FIG. 3, the mounting element or mounting face 68 has a pair of upper apertures 74, which receive the pump mounting plate cap screws 72, and a pair of lower apertures 76 which are instrumental in the mounting of a pump cover housing indicated in its entirety by the numeral 78.

The power plant or engine 22 has a forwardly projecting power shaft 80, which may be typically a forward extension of the engine crankshaft, not shown. The support 24 has a fore-and-aft aperture or opening 82, which, because of the peculiarity of the particular design of the support 24, is in fore-and-aft alignment with a rearwardly disposed aperture or opening 84 also in the support. A coupling shaft 86 extends through the coaxial apertures 82 and 84 and is coupled at its rear end at 88 by any suitable coupling to the power plant shaft 80. The forward end of the shaft 86 is suitably coupled at 90 to a pump input shaft 92 (FIG. 6). Since the support 24 is rigidly attached to the front of the engine 22, and since the pump 66 is rigidly mounted on the mounting element 68, which is a part of the support 24, proper alinement of the shafts 80 and 92 is effected and maintained, and is not disturbed by whatever rearward tilting movement may occur in the frontal element 28. Suitable hydraulic lines, as at 94, lead to the hydraulic circuit of which the loader control cylinders 64 are parts. As illustrated, these conduits lead rearwardly through the lower portion of the frontal opening 46 afforded by the element 28, passing between the transverse shaft 52 and the transverse cross or bottom part 36 of the element 28.

The cover housing 78, previously referred to as enclosing the pump 66 at the front of the tractor, is a relatively heavy structural member and has a front part 96, a top 98, a sloping bottom 100 and opposite sides 102. The sloping bottom 100 is transversely flanged at 104 to receive cap screws 106 which are threadedly received by the previously described lower apertures 76 in the mounting element 68. The sides 102 of the cover housing 78 are suitably notched at 108 to accommodate the configuration of the bottom part 36 of the element 28, which is itself cut out at 110 to afford a suitable fit (FIGS. 3 and 4).

The width of the cover housing 78 is commensurate with the width of the frontal opening 46 in the element 28, and the location of the pump 66 and the vertical dimension of the cover housing are such that the upper portion of the cover housing overlaps the lower portion of the frontal opening 46. Thus, the cover housing 78 not only encloses the pump 66 but also closes the lower part of the frontal opening 46. For the purpose of providing additional mounting for the cover housing 78, the top thereof has a transverse rear flange 112 which is secured by cap screws 114 to apertured ears or lugs 116 on the element 28 (FIGS. 3 and 6). The plane of the lugs 116 is rearwardly offset from the plane of marginal interior mounting portions 118 within the top, sides and bottom of the element 28. Since the portion 118 extends marginally around the element parts just described, it may be referred to as an interior mounting rim, and for that purpose it has a plurality of tapped bores 120.

When the cover housing 78 is in place it of course reduces the total area of the frontal opening 46 by occupying part of this area. The remainder of the area is filled in by a perforated grille panel 122 which is secured to the marginal rim 118 as by cap screws 124 and which is additionally secured to the front side of the upper transverse cover housing flange 112 as by cap screws 126.

When the pump 66 and cover housing 78 are removed from the tractor, a larger substitute grille, not shown, may replace the grille panel 122. In the construction illustrated, the panel 122 may be easily removed for access to the interior components, such as represented by the parts 44 and 24. The cover housing 78 not only encloses the pump 66 for protection thereof from dirt and damage but adds to the appearance of the tractor because of its relatively pleasing shape. The connections of the cover housing 78 to the element 28, at 114, include provision for adequate lost motion, as by elongated holes for the cap screws 114, to accommodate the previously described tilting of the element 28. Further, there is sufficient inherent resiliency in the cover housing to absorb any strains incident to movement of the element 28. The nature of the cover housing is also such that it will serve to some extent as a bumper.

The fundamental principles of the invention have been brought out above and need not be reiterated. Features and advantages other than those enumerated will readily occur to those versed in the art, as will many modifications and alterations in the preferred embodiment of the invention disclosed, all of which may be achieved without departure from the spirit and scope of the invention.

What is claimed is:

1. In a tractor having a fore-and-aft body including a forward power plant equipped with a forwardly projecting power shaft, the improvement comprising: a support rigidly mounted at the front end of the body and having an opening therethrough in fore-and-aft alinement with the power shaft and further having a front mounting element below the level of said opening; a generally rectangular upright transverse frame carried by and rising from the support and having a transverse lower part intermediate the levels of the mounting element and support opening, a pair of upright side parts and a top part defining a frontal opening affording access to the support from the front of the tractor; an auxiliary driven device carried by the mounting element and projecting ahead of the general plane of said frame and having a fore-and-aft shaft extending over the transverse lower frame part and through the support opening and coaxially connected to the power shaft; a cover housing at least partly enclosing the device and having a front portion ahead of the device, a bottom portion below the device and secured to the mounting element and a top part over the device and secured to the frame to overlie the bottom portion of said frontal opening; and removable panel means mounted within the frame in the remainder of said frontal opening.

2. In a tractor having a fore-and-aft body including a forward power plant equipped with a forwardly projecting power shaft, the improvement comprising: a front mounting element ahead of and below the level of said power shaft; a generally rectangular upright transverse frame carried by and rising from the front of the body and having a transverse lower part intermediate the levels of the mounting element and the axis of said shaft, a pair of upright side parts and a top part defining a frontal opening affording rearward access to the front end of the tractor body; an auxiliary driven device carried by the mounting element and projecting ahead of the general plane of said frame and having a fore-and-aft shaft coaxially connected to the power shaft; a cover housing at least partly enclosing the device and having a front portion ahead of the device, and a top part over the device and secured to the frame to overlie the bottom portion of said frontal opening; and removable panel means mounted within the frame in the remainder of said frontal opening.

3. The invention defined in claim 2, in which: the side and top parts of the frame respectively have coplanar inner portions for receiving the side and top edges of the panel, and the top part of the cover housing has a transverse upper portion coplanar with said frame part portions for receiving the bottom edge of the panel.

4. The invention defined in claim 2, in which: the cover housing is a box-like structure including opposite side parts respectively at opposite sides of the device and notched to accommodate the transverse lower part of the frame.

5. In a vehicle having a body including a power plant equipped with a forwardly projecting power shaft, the improvement comprising: a protective frame carried by the body ahead of the power plant and affording a frontal opening; an auxiliary driven device carried by the body independently of the frame and ahead of the power plant and driven by the power shaft; a cover housing for the device and received within and partly closing said frontal opening and detachably secured to the frame; and a protective panel detachably carried by the frame in the remainder of said frontal opening and removable independently of the cover housing.

6. In a tractor having a fore-and-aft body including a forward power plant equipped with a forwardly projecting power shaft, the improvement comprising: a generally rectangular upright transverse frame rising from the front of the body and having a transverse lower part, a pair of upright side parts and a top part defining a frontal opening affording rearward access to the front end of the tractor body; means mounting the frame on the body for limited shifting relative to the body; an auxiliary driven device mounted on the body front end independently of the frame and projecting ahead of the general plane of said frame and having a fore-and-aft shaft coaxially connected to the power shaft; a cover housing at least partly enclosing the device and having a front portion ahead of the device, a top part over the device and secured to the frame and a bottom part under the device and secured to the body, said cover housing being flexible to accommodate shifting of the frame.

References Cited in the file of this patent

UNITED STATES PATENTS

| | | |
|---|---|---|
| 1,538,881 | Barton | May 26, 1925 |
| 2,325,729 | Allin | Aug. 3, 1943 |
| 2,375,801 | Le Tourneau | May 15, 1945 |
| 2,399,733 | Hagen | May 7, 1946 |
| 2,402,449 | Rockwell | June 18, 1946 |
| 2,495,144 | Simmonds | Jan. 17, 1950 |
| 2,769,501 | Wagner | Nov. 6, 1956 |
| 2,857,009 | Adams et al. | Oct. 21, 1958 |